United States Patent [19]

Anderson et al.

[11] Patent Number: 4,936,659
[45] Date of Patent: Jun. 26, 1990

[54] LIQUID CRYSTAL DISPLAY BRIGHTNESS ENHANCER

[75] Inventors: Roger D. Anderson, Marengo; Manuel Lara, Cedar Rapids, both of Iowa

[73] Assignee: Rockwell International Corporation, El Segundo, Calif.

[21] Appl. No.: 302,481

[22] Filed: Jan. 26, 1989

[51] Int. Cl.⁵ .............................................. G02F 1/133
[52] U.S. Cl. ................................. 350/339 D; 350/338; 350/345
[58] Field of Search ................... 350/345, 338, 339 D; 362/342, 347, 355, 297, 298

[56] References Cited

U.S. PATENT DOCUMENTS

| | | | |
|---|---|---|---|
| 3,043,038 | 7/1962 | Marble | 40/546 |
| 3,043,947 | 7/1962 | Albinger, Jr. | 362/31 |
| 3,241,256 | 3/1966 | Viret et al. | 40/546 |
| 3,905,682 | 9/1975 | Meyerhofer | 350/338 |
| 4,040,727 | 8/1977 | Ketchpel | 350/601 |
| 4,043,636 | 8/1977 | Eberhardt | 350/345 |
| 4,315,258 | 2/1982 | McKnight et al. | 340/784 |
| 4,487,481 | 12/1984 | Suzawa | 350/345 |
| 4,664,481 | 5/1987 | Ito et al. | 350/345 |
| 4,803,399 | 2/1989 | Ogawa et al. | 350/345 X |

FOREIGN PATENT DOCUMENTS

| | | | |
|---|---|---|---|
| 0094738 | 5/1984 | Japan | 350/339 D |
| 0110422 | 5/1988 | Japan | 350/345 |

*Primary Examiner*—Stanley D. Miller
*Assistant Examiner*—Anita Pellman Gross
*Attorney, Agent, or Firm*—Gregory G. Williams; M. Lee Murrah; H. Fredrick Hamann

[57] ABSTRACT

A liquid crystal display having enhanced viewing brightness and brightness uniformity which utilizes a plurality of reflective dots disposed on the lamp side of a diffuser which is positioned between a back lamp and the viewing surface so that light emitted from the back lamp is reflected off of the reflective dots back to a reflector assembly positioned behind the back lamp and is then reflected back toward the light diffuser in a direction toward the viewing surface.

2 Claims, 1 Drawing Sheet

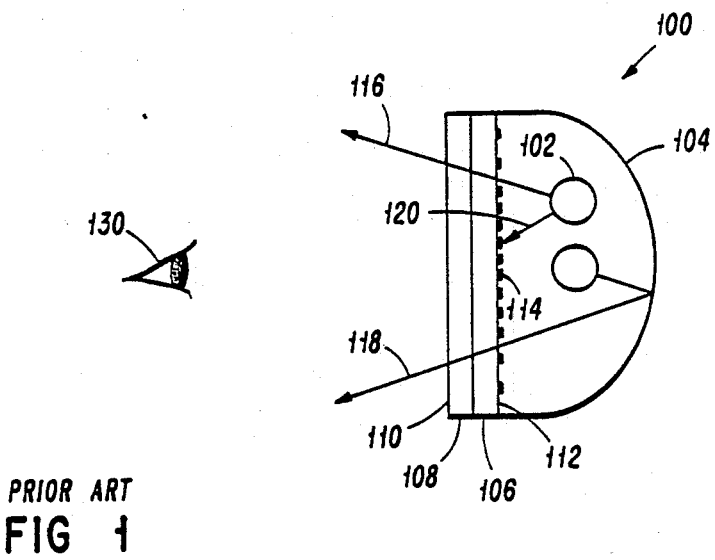
PRIOR ART
FIG 1
FIG 2
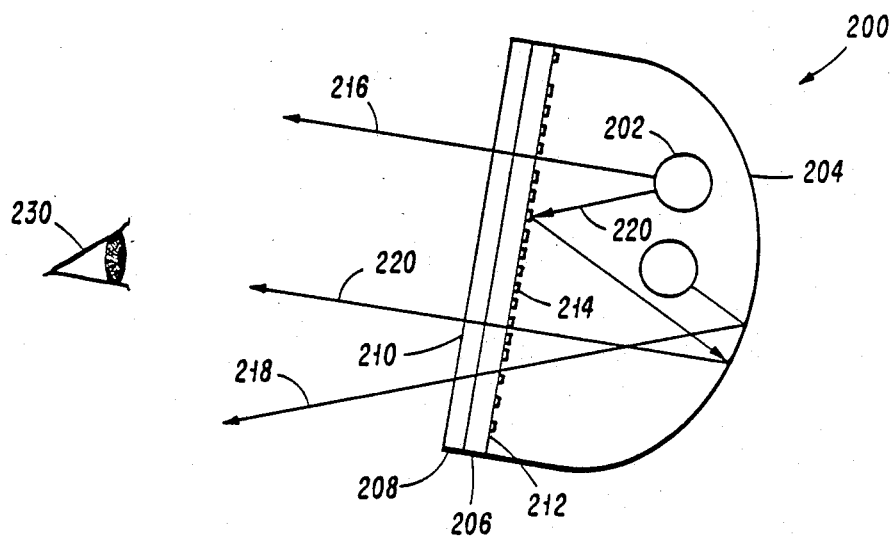

LIQUID CRYSTAL DISPLAY BRIGHTNESS ENHANCER

FIELD OF THE INVENTION

The present invention generally relates to visual display devices; and more particularly, relates to liquid crystal displays having a back light; and even more particularly, concerns an apparatus for enhancing the overall brightness and uniformity of light across the viewing surface of a back lighted liquid crystal display panel.

BACKGROUND OF THE INVENTION

With the ever expanding frontiers of space and aviation, and with modern aircraft now operating at altitudes which only a few decades ago were thought to be impossible, it is becoming increasingly important to overcome some problems introduced by high altitude flight. At high altitudes, the ambient light is often quite bright and may adversely affect the performance of optical avionics equipment.

One particular type of avionics equipment in which high ambient light is posing vexing problems is liquid crystal displays. Basically, back lighted LCD's utilize a back light to generate a white light which is filtered by a liquid crystal filter to create an image. The back light is frequently an incandescent or fluorescent lamp which typically have bright spots therein. The bright spots have been attenuated, in the past, by placing light absorbing dots on the lamp side of a diffuser placed between the lamp and the liquid crystal filter.

While this design, or variations of it, have enjoyed significant use in the past, it does have several serious drawbacks. A major drawback with the light absorptive dots placed on the lamp side of the diffuser is that it causes an overall reduction in the brightness of the liquid crystal display panel. Another problem with such a design is, the absorptive dots typically absorb heat, as well as light, and thereby create a panel with a higher overall operating temperature.

Consequently, there exists a need for an improvement and advancements in the design of liquid crystal display panels which provide for a uniform brightness across the liquid crystal panel with a concomitant increase in overall panel brightness, without any increase in lamp power or operating temperature.

SUMMARY OF THE INVENTION

It is the object of the present invention to provide a liquid crystal display having uniform light distribution across the display viewing surface.

It is a feature of the present invention to include a light diffuser having light reflecting dots on its lamp side; the light diffuser being interposed between the back light and the liquid crystal filter.

It is an advantage of the present invention to enhance the uniformity of the light across the liquid crystal display panel by attenuating the light associated with bright spots in the back light and reflecting this light back toward back light and reflector assembly so that it may be utilized to enhance the brightness in darker areas of the display panel.

The present invention provides a liquid crystal display device which is designed to satisfy the aforementioned needs, produce the earlier propounded objects, include the above described features, and achieve the already articulated advantages. The invention is carried in a "non-absorptive dot" approach, in the sense that no absorptive dots are placed on the lamp side of the light diffuser. Instead, dots are formed on the lamp side of the diffuser which are reflective in nature; thereby, both attenuating the transmission of the light through the bright spots while enhancing the brightness of the light through the more dark areas.

Accordingly, the present invention relates to a liquid crystal display panel where a back lamp is provided with a reflector assembly for reflecting light toward the viewing surface and a light diffuser having reflective dots positioned on the lamp side, for both attenuating light in the bright spots and enhancing the brightness in the darker spots, the light diffuser being interposed between the back light and a liquid crystal filter.

BRIEF DESCRIPTION OF THE DRAWINGS

FIG. 1 is a schematic cross sectional representation of a liquid crystal display, of the prior art, which utilizes absorptive dots placed on the lamp side of the light diffuser.

FIG. 2 is a schematic cross-sectional representation of the liquid crystal display, of the present invention, which utilizes reflective dots placed on the lamp side of the light diffuser.

DETAILED DESCRIPTION

Now referring to the drawings, and more particularly to FIG. 1, there is shown a liquid crystal display, generally designated 100, of the prior art. Display 100 is shown having a back light 102 therein. Also shown is a reflector assembly 104 for reflecting light rays emanating from the back side of back light 102. A light diffuser 106, having a lamp side 112 thereon, is disposed between back light 102 and liquid crystal filter 108 which has a viewing surface 110 thereon. A plurality of light absorptive dots 114 are placed on the lamp side 112 of diffuser 106. Light ray 116 emanates from back light 102 and proceeds through the diffuser and liquid crystal filter 108 and extends generally toward the viewer 130. Light ray 118 is shown emanating from the back side of back light 102 and reflecting off of reflector assembly 104 and thereon extending through diffuser 106 and liquid crystal 108 in a direction generally directed toward the viewer 130. Light ray 120 is shown emanating from back light 102 and being absorbed by a light absorptive dot 114 on the lamp side of diffuser 106.

Now referring to FIG. 2, there is shown a liquid crystal display, generally designated 200, of the present invention. This display 200 is shown having a back light 202, which is preferably a fluorescent tube, and a reflector assembly 204 for reflecting light incident thereon in a direction toward the viewer 230. A light diffuser 206 having a plurality of light reflective dots 214 on its lamp side 212 is interposed between the back light 202 and the liquid crystal filter 208, which has a viewing surface 210 thereon.

The light diffuser 206 is preferably an acrylic, milky white translucent material, which is well know in the industry.

The light reflective dots 214 are preferably made of aluminum and are first vapor deposited on the diffuser in a sheet and the unwanted portion is then etched away, but any other material with similar optical characteristics could be substituted and any other method of deposition could be used.

The selection of the dot placement on diffuser 206 is done in a manner similar to the selection of dot placement for absorptive dots on prior art diffusers.

Light ray 216 is shown emanating from back light 202 and progressing between the plurality of light reflecting dots 214 through the light diffuser 206 and liquid crystal filter 208 and continuing in a direction generally toward the view 230. Light ray 21B is shown emanating from the back light 202 reflecting off the reflector assembly 204 and passing between the plurality of light reflective dots 214 on the light diffuser 206 and thereby continuing through the liquid crystal filter 208 in a direction generally toward the viewer 230.

The enhancement of the overall brightness of the liquid crystal display 200 is demonstrated by an analysis of light ray 220 which; emanates from back light 202, strikes a light reflective dot of the plurality of light reflecting dots 214, reflects off the dots 214 toward the reflector assembly 204, reflects off the reflector assembly 204 in a direction generally toward the viewer 230, passes between the plurality of light reflective dots 214 and finally passes through the diffuser 206 and liquid crystal filter 208. Light ray 220 exemplifies the advantage of the present invention. Not only does the present invention provide for the attenuation of a bright spot, which would normally occur at a position where light ray 220 was originally incident upon the light diffuser 206; it provides a brightness enhancement. The light ray 220 is not absorbed at this position, but is reflected, and thereby allows for a recovery of that light. Light ray 220 is reflected off the reflective dot 214 toward, and then off, the reflector assembly 204 and then passes between the interstices in the plurality of light reflecting dots 214, at a position which might be generally considered a darker spot on the liquid crystal panel.

It is thought that the liquid crystal display panel of the present invention and many of its intended advantages will be understood from the foregoing description, and it will be apparent various changes in the form, construction, and arrangement of the parts thereof may be made without departing from the spirit and scope of the invention, or sacrificing all of its material advantages, the forms herein before described being merely preferred or exemplary embodiments thereof.

We claim:

1. An improved light diffuser, of the type used in visual display devices, to diffuse light from a light source and a reflector, with the diffuser being disposed between the light and reflector combination, and a liquid crystal filter, the diffuser having bright spots thereon and dim spots thereon, wherein the improvement comprises:

a plurality of optically reflecting dots disposed on said diffuser, at predetermined positions which correspond to bright spots on said diffuser, so that light is reflected off said dots and is directly incident upon the reflector and back again toward said diffuser;

whereby a visual display device with enhanced light intensity uniformity is provided by both attenuating the light at bright spots while increasing the light at dim spots.

2. An avionics display device for providing a visual display of information in a form that is perceivable by a human eye in a high ambient light environment, the display device comprising:

a plurality of liquid crystal cells arranged in a planar matrix array, with each cell having the capability of passage when energized and also having the capability of including light passage when not energized;

a fluorescent light source for providing visible light to said plurality of liquid crystal cells, said fluorescent light source emitting light in a direction toward said plurality of liquid crystal cells and also in an opposite direction, said fluorescent light source being spatially separated from said plurality of liquid crystal cells so that said visible light must traverse a gap before encountering the plurality of liquid crystal cells;

a reflector, having a predetermined optical reflectivity characteristic, so that the light emitted from said source, in a direction opposite the direction of said plurality of liquid crystal cells, is reflected toward said plurality of liquid crystal cells, said reflector positioned so that said light source is disposed between said reflector and said plurality of liquid crystal cells and so that there exists void between said reflector and said plurality of liquid crystal cells;

a planar light diffuser juxtaposed with said plurality of liquid crystal cells and said light source, said planar light diffuser having a planar lamp side which is positioned towards said light source;

a plurality of optically reflective dots, disposed at predetermined relatively bright positions on said planar lamp side of said diffuser, for directly reflecting light which is incident upon said dots across said void toward said reflector, so that it can be reflected back to a different and relatively dim position on said lamp side of said diffuser; and means for controlling the voltage supplied to each of said plurality of liquid crystal cells in the matrix array, so that a visual image can be displayed;

whereby the overall uniformity of light intensity across the visual image is increased without a decrease in the average overall output of light from the avionics display device, by attenuating the light at the relatively bright positions and concomitantly increasing the brightness at relatively dim positions.

* * * * *